US012749402B2

(12) United States Patent
Furufuji et al.

(10) Patent No.: US 12,749,402 B2
(45) Date of Patent: Sep. 29, 2026

(54) NOTIFICATION SYSTEM

(71) Applicant: Stanley Electric Co., Ltd., Tokyo (JP)

(72) Inventors: Sumihisa Furufuji, Tokyo (JP); Kazuhiko Ueno, Tokyo (JP); Kenichi Saito, Tokyo (JP); Kazunori Hirose, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 181 days.

(21) Appl. No.: 18/844,967

(22) PCT Filed: Mar. 3, 2023

(86) PCT No.: PCT/JP2023/008138

§ 371 (c)(1),
(2) Date: Mar. 26, 2025

(87) PCT Pub. No.: WO2023/176524

PCT Pub. Date: Sep. 21, 2023

(65) Prior Publication Data

US 2025/0225875 A1 Jul. 10, 2025

(30) Foreign Application Priority Data

Mar. 14, 2022 (JP) ................................ 2022-039515

(51) Int. Cl.
*G08G 1/16* (2006.01)
*G06V 10/94* (2022.01)
(Continued)

(52) U.S. Cl.
CPC ............ *G08G 1/166* (2013.01); *G06V 10/95* (2022.01); *G06V 20/54* (2022.01); *G08G 1/04* (2013.01);
(Continued)

(58) Field of Classification Search
CPC ........... G08G 1/166; G08G 1/04; G08G 1/08; G06V 20/54; G06V 10/95; G06V 2201/08; H04N 23/90
(Continued)

(56) References Cited

U.S. PATENT DOCUMENTS 12,080,495 B1 * 9/2024 Boman .............. F21V 23/0471
2017/0032669 A1 * 2/2017 Wu ......................... G08G 1/04
(Continued)

FOREIGN PATENT DOCUMENTS

JP 2017155577 A 9/2017
JP 2018054498 A 4/2018
(Continued)

OTHER PUBLICATIONS

International Search Report and Written Opinion of the International Search Report for PCT/JP2023/008138 dated May 23, 2023 in English.

*Primary Examiner* — Naomi J Small
(74) *Attorney, Agent, or Firm* — Kenealy Vaidya LLP

(57) ABSTRACT

To form road markings for traveling vehicles at appropriate timing according to road situation.
A notification system including road lights installed along a road which are directly connected to each other, where each road light includes: an image processing unit that detects a crosser and a vehicle traveling on the road, based on image data obtained by photographing the road; a first signal processing unit that generates a crosser detection signal when the crosser is present and transmits the crosser detection signal to the other road lights; a second signal processing unit that generates a vehicle detection signal when the vehicle is present and transmits the vehicle detection signal to the other road lights which exist in the traveling direction of the vehicle; and a notification execution unit that per-
(Continued)

forms notification when both the crosser detection signal and the vehicle detection signal transmitted from the other road lights are received.

9 Claims, 10 Drawing Sheets

(51) Int. Cl.

| | |
|---|---|
| ***G06V 20/54*** | (2022.01) |
| ***G08G 1/04*** | (2006.01) |
| ***G08G 1/08*** | (2006.01) |
| ***H04N 23/90*** | (2023.01) |

(52) U.S. Cl.
CPC ............... *G08G 1/08* (2013.01); *H04N 23/90* (2023.01); *G06V 2201/08* (2022.01)

(58) Field of Classification Search
USPC .......................................................... 340/463
See application file for complete search history.

(56) References Cited

U.S. PATENT DOCUMENTS

| | | | | |
|---|---|---|---|---|
| 2020/0180612 | A1* | 6/2020 | Finelt | B60W 60/0027 |
| 2021/0027621 | A1 | 1/2021 | Bseileh et al. | |
| 2022/0410881 | A1* | 12/2022 | Young | B60W 30/095 |
| 2023/0041448 | A1* | 2/2023 | Fiedler | B60Q 1/547 |

FOREIGN PATENT DOCUMENTS

| | | | |
|---|---|---|---|
| JP | 2019082759 | A | 5/2019 |
| JP | 2020087883 | A | 6/2020 |
| JP | 2020087884 | A | 6/2020 |

* cited by examiner

FIG. 8

| | A1 | A2 | A3 | A4 | A5 | A6 | A7 | A8 | A9 |
|---|---|---|---|---|---|---|---|---|---|
| CROSSER DETECTION | | | | | | | | | |
| B-LANE CROSSER DETECTION SIGNAL | | | | | | | | | |
| C-LANE CROSSER DETECTION SIGNAL | | | | | | | | | |
| B-LANE VEHICLE DETECTION | ○ | | | ○ | | | | | |
| B-LANE VEHICLE DETECTION SIGNAL | ○ | ○ | | | ○ | ○ | ○ | | |
| C-LANE VEHICLE DETECTION | | | | | | | | | ○ |
| C-LANE VEHICLE DETECTION SIGNAL | | | | | | ○ | ○ | ○ | |
| B-LANE NOTIFICATION, ROAD SURFACE DRAWING | | | | | | | | | |
| C-LANE NOTIFICATION, ROAD SURFACE DRAWING | | | | | | | | | |

FIG. 10

| | A1 | A2 | A3 | A4 | A5 | A6 | A7 | A8 | A9 |
|---|---|---|---|---|---|---|---|---|---|
| CROSSER DETECTION | | | | | ○ | | | | |
| B-LANE CROSSER DETECTION SIGNAL | | ○ | ○ | ○ | ○ | | | | |
| C-LANE CROSSER DETECTION SIGNAL | | | | | ○ | ○ | ○ | ○ | |
| B-LANE VEHICLE DETECTION | ○ | | | | | ○ | | | |
| B-LANE VEHICLE DETECTION SIGNAL | | ○ | ○ | ○ | ○ | | ○ | ○ | ○ |
| C-LANE VEHICLE DETECTION | | | | | | | ○ | | |
| C-LANE VEHICLE DETECTION SIGNAL | | | | ○ | ○ | ○ | | | |
| B-LANE NOTIFICATION, ROAD SURFACE DRAWING | | ○ | ○ | ○ | ○ | | | | |
| C-LANE NOTIFICATION, ROAD SURFACE DRAWING | | | | | ○ | ○ | | | |

NOTIFICATION SYSTEM

This application is a U.S. National Stage Application under 35 U.S.C § 371 of International Patent Application No. PCT/JP2023/008138 filed Mar. 3, 2023, which claims the benefit of priority under 35 U.S. C. § 119 to Japanese Patent Application No. 2022-039515 filed Mar. 14, 2022, the disclosures of all of which are hereby incorporated by reference in their entireties.

TECHNICAL FIELD

The present disclosure relates to a notification system.

BACKGROUND ART

Japanese Unexamined Patent Application Publication No. 2020-87884 (Patent Document 1) describes a street light system that includes a plurality of street lights installed along roads on which vehicles travel and can be lit in a plurality of light colors including at least one warning color, each having a sound sensor that collects sound from the surroundings and generates collected sound data, an acoustic signal processing unit that receives the collected sound data and detects a target sound indicating an emergency vehicle and its source position based on the collected sound data, and generates emergency vehicle route data that indicates the current position and traveling direction of the emergency vehicle, and a light color control unit that generates a warning color lighting signal that instructs to light up at least one street light installed on the traveling path of the emergency vehicle in a warning color based on the emergency vehicle route data.

PRIOR ART DOCUMENT

Patent Document

[Patent Document 1] Japanese Unexamined Patent Application Publication No. 2020-87884

SUMMARY

Technical Problem

In a specific aspect, the present disclosure can provide a notification system capable of performing notification of road markings or the like to traveling vehicles at appropriate timing according to road situation.

Solution to the Problem

A notification system according to one aspect of the present disclosure is (a) a notification system configured to include a plurality of road lights installed along a road which are directly connected to mutually communicate with each other, (b) where each of the plurality of road lights includes:

- (b1) an image processing unit that detects presence or absence of a crosser who proceeds to cross the road and presence or absence of a vehicle traveling on the road, based on image data obtained by photographing the road;
- (b2) a first signal processing unit that generates a crosser detection signal when the crosser is present and transmits the crosser detection signal to the other road lights,
- (b3) a second signal processing unit that generates a vehicle detection signal when the vehicle is present and transmits the vehicle detection signal to the other road lights which exist in the traveling direction of the vehicle, and
- (b4) a notification execution unit that performs notification for alert purpose when both the crosser detection signal and the vehicle detection signal transmitted from the other road lights are received.

According to the above configuration, there is provided a notification system capable of performing notification of road markings or the like to traveling vehicles at appropriate timing according to road situation.

BRIEF DESCRIPTION OF THE DRAWINGS

FIG. 8 is a diagram for explaining operation of each road light of a road drawing system in the road situation shown in FIG. 7.

FIG. 10 is a diagram for explaining operation of each road light of a road drawing system in the road situation shown in FIG. 9.

MODE FOR CARRYING OUT THE DISCLOSED SUBJECT MATTER

Figure 1:
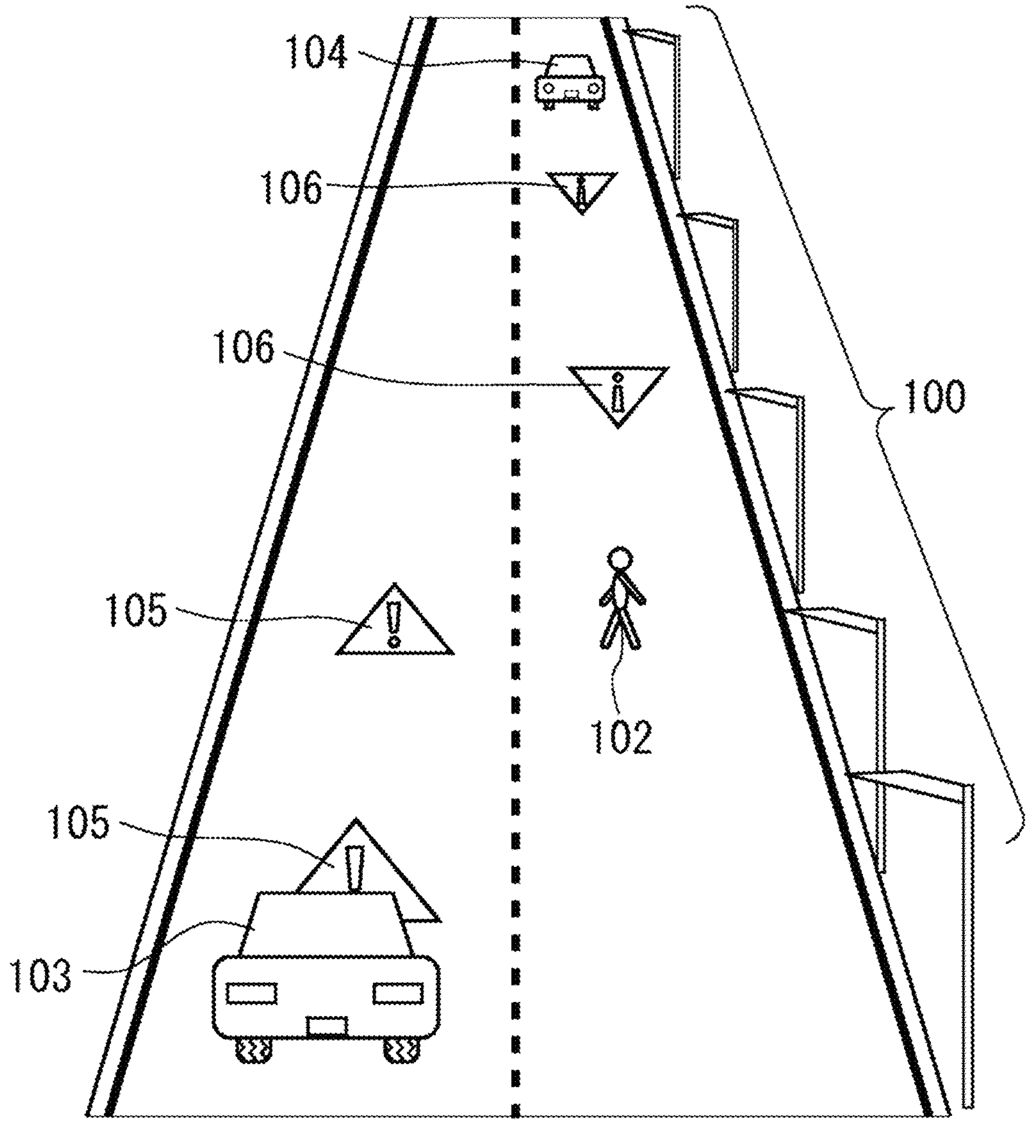
FIG. 1 is a diagram for explaining a schematic configuration of a notification system according to one embodiment.

FIG. 1 is a diagram for explaining a schematic configuration of a notification system according to one embodiment. FIG. 1 shows a schematic overhead view of a road.

The notification system 100 according to the present embodiment is configured to include a plurality of road lights arranged on a side of the road, and when a pedestrian 102 who crosses the road (refer to as a "crosser" hereinafter in this specification) is present and when a running vehicle 103 and 104 are present on the road, road marking images 105 and 106 are drawn on the road surface visible to the passengers (e.g., drivers) of the running vehicles 103 and 104. By drawing such road marking images 105 and 106, it is possible to alert the passengers of the running vehicles 103 and 104 to the presence of the pedestrian 102, and also to alert the pedestrian 102 to the presence of the vehicles 103 and 104.

Figure 2A:
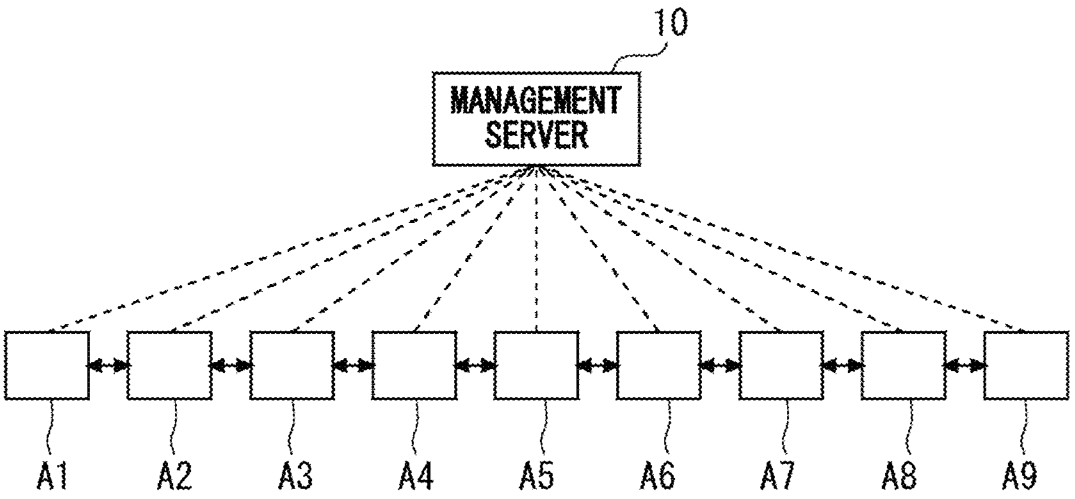
FIG. 2A is a block diagram illustrating an overall configuration of the notification system.

FIG. 2A is a block diagram illustrating an overall configuration of the notification system. The illustrated notification system 100 is configured to include a plurality of road lights A1, A2, A3, . . . A9, and a management server 10 that is communicatively connected to each of these road lights A1 to A9.

The road lights A1 to A9 are directly connected to mutually communicate with each other without going through the management server 10. Specifically, each of the road lights A1 to A9 are associated with each other as one group, and are connected so that they can communicate with each other within this group. And, data from one road light can be sent to all the other road lights and can be shared within the group.

Each road light A1 to A9 is assigned an individual identification number to identify itself, and its installation location (latitude and longitude) is also assigned.

Figure 2B:
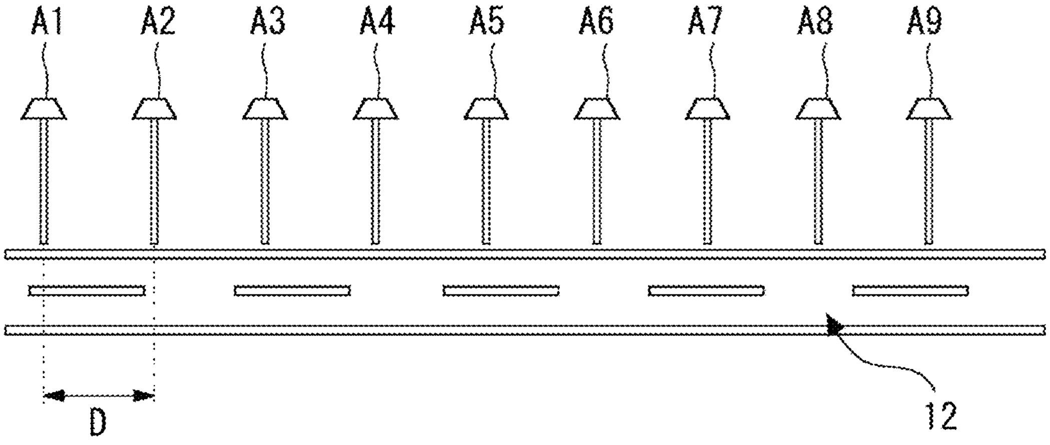
FIG. 2B is a diagram schematically illustrating an installation state of each road light.

As shown in FIG. 2B, for example, each of the road lights A1 to A9 are arranged at intervals along a road 12 on one outer side of the road 12. In the example shown, the mutual intervals D between the road lights A1-A9 are constant, but is not limited thereto. Each of the road lights A1 to A9 is arranged above the road by pillars, and is configured to emit light toward the surface of the road 12 and to be able to form road marking images 105, 106 (refer to FIG. 1).

The management server 10 is connected to each of the road lights A1 to A9 so that they can communicate one-to-one. Communication between the management server 10 and each of the road lights A1 to A9 is configured to occur only when necessary in order to reduce the amount of communication data. Specifically, when any of the road lights A1 to A9 determines through its own self-diagnosis function that a malfunction has occurred, such as an inability to perform autonomous control, the road light with the malfunction sends data including malfunction information to the management server 10. In such a case, the management server 10 takes over control of the road light with the malfunction.

Further, the management server 10 communicates with each of the road lights A1-A9 when a system update or other such needs arise. Further, when necessary, the management server 10 can also request each of the road lights A1-A9 to transmit data indicating their operating status, image data generated by the cameras equipped in each of the road lights A1-A9, and other data communicated between the road lights A1-A9, and acquire those data.

Figure 3:
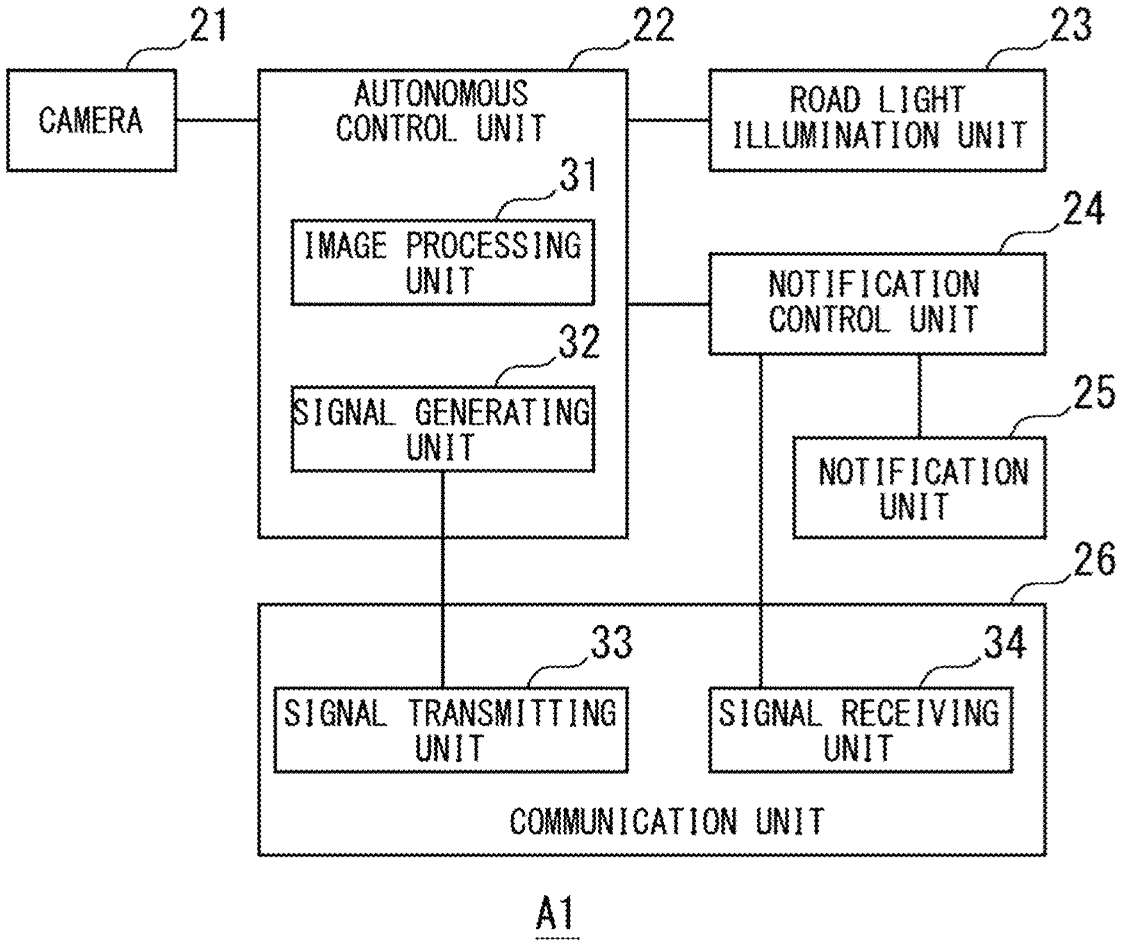
FIG. 3 is a block diagram illustrating the configuration of each road light.

FIG. 3 is a block diagram illustrating the configuration of each road light. Here, note that while the configuration of a road light A1 is shown here, the other road lights A2 to A9 have the same configuration as the road light A1. The road light A1 shown in the figure is configured to include a camera 21, an autonomous control unit 22, a road light illumination unit 23, a notification control unit 24, a notification unit 25, and a communication unit 26.

The camera 21 is connected to the autonomous control unit 22, and photographs a predetermined range of the road corresponding to the location of the road light A1 and outputs its image data to the autonomous control unit 22.

The autonomous control unit 22 has an image processing unit 31 that detects the presence or absence of objects such as pedestrians and vehicles, as well as their respective traveling directions and speeds, by performing predetermined image processing on the image data (video data) output from the camera 21, and has a signal generating unit 32 that generates a signal indicating that the objects have been detected according to the detection result of the objects by the image processing unit 31 and outputs the data to a signal transmitting unit 33 of the communication unit 26. This autonomous control unit 22 can be realized by executing a predetermined operating program in a computer system such as that shown in FIG. 4, which is to be described later.

The road light illumination unit 23 is connected to the autonomous control unit 22, and is controlled by the autonomous control unit 22 to turn on in order to illuminate the road during specific time of the day, such as at night. The notification control unit 24 is connected to the autonomous control unit 22, and controls the operation of the notification unit 25 based on a signal generated by the signal generating unit 32 of the autonomous control unit 22, causing a predetermined road marking image to be drawn on the road. Further, the notification control unit 24 is connected to the signal receiving unit 34 of the communication unit 26, and controls the operation of the notification unit 25 based on signal data indicating the detection state of an object transmitted from the other road lights A2 to A9 and received by the signal receiving unit 34, causing a predetermined road marking image to be drawn on the road.

The notification unit 25 is connected to the notification control unit 24, and its operation is controlled by the notification control unit 24 to draw a predetermined road marking image on the road. The road marking image by the notification unit 25 can be set to various types such as letters, symbols, and icons. Further, the notification by the notification unit 25 is not limited to a road marking image, but may be a side surface warning light, or may be a direct notification to vehicles near the road light A1 via dedicated narrow-band communication or other communication. The following mainly describes road marking images as an example.

The communication unit 26 is connected to the autonomous control unit 22 and is used for data communication between the road light A1 and the other road lights A2 to A9. The communication unit has a signal transmitting unit 33 that transmits signal data generated by the signal generating unit 32 to each communication units 26 of the other road lights A2 to A9, and a signal receiving unit 34 that receives signal data transmitted from the communication units 26 of the other road lights A2 to A9. The communication unit 26 is also connected to the notification control unit 24, and the signal data received by the signal receiving unit 34 is also sent to the notification control unit 24.

Here, in the present embodiment, the signal generating unit 32 of the autonomous control unit 22 and the signal transmitting unit 33 of the communication unit 26 form a "first signal processing unit" and a "second signal processing unit", and the notification control unit 24, the notification unit 25, and the signal receiving unit 34 of the communication unit 26 form a "notification execution unit".

Figure 4:
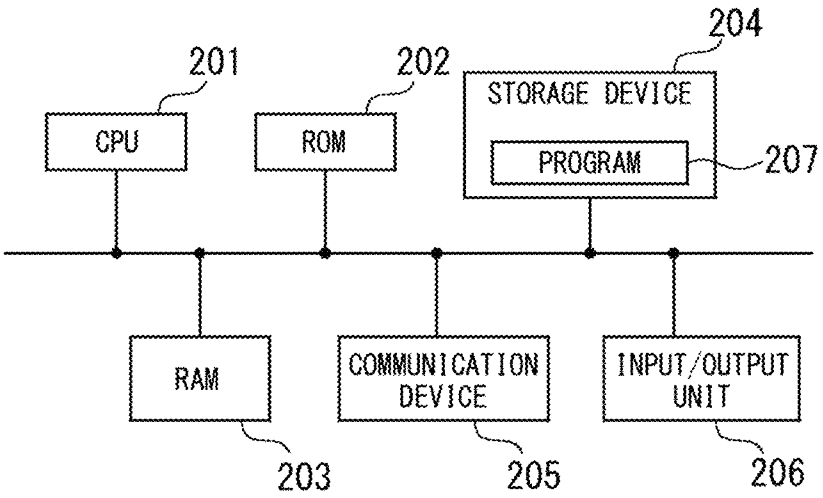
FIG. 4 is a diagram illustrating a configuration example of a computer system.

FIG. 4 is a diagram illustrating a configuration example of a computer system. By using the computer system as shown in the figure, it is possible to configure the autonomous control unit 22, notification control unit 24, and the communication unit 26 of each of the above-described road lights A1, etc. Specifically, the computer system shown in FIG. 4 is configured to include a CPU (central processing unit) 201, a ROM (read only memory) 202, a RAM (temporary storage memory) 203, a storage device 204, a communication device 205, and an input/output unit 206. These CPU 201 or the like are connected to each other via a bus so that they can communicate with each other.

The CPU 201 performs information processing by reading and executing a program 207 stored in the storage device 204. The ROM 202 stores basic control programs and the like necessary for the operation of the CPU 201. The RAM 203 temporarily stores data necessary for the information processing of the CPU 201. The storage device 204 is a large-capacity storage device for storing data, and is comprised of a hard disk drive, solid state drive, or the like. The communication device 205 performs processing related to data communication with other external devices. The input/output unit 206 is an interface for connection to external devices, and in the present embodiment, is used for connection to the camera 21, the road light illumination unit 23, etc.

Figure 5:
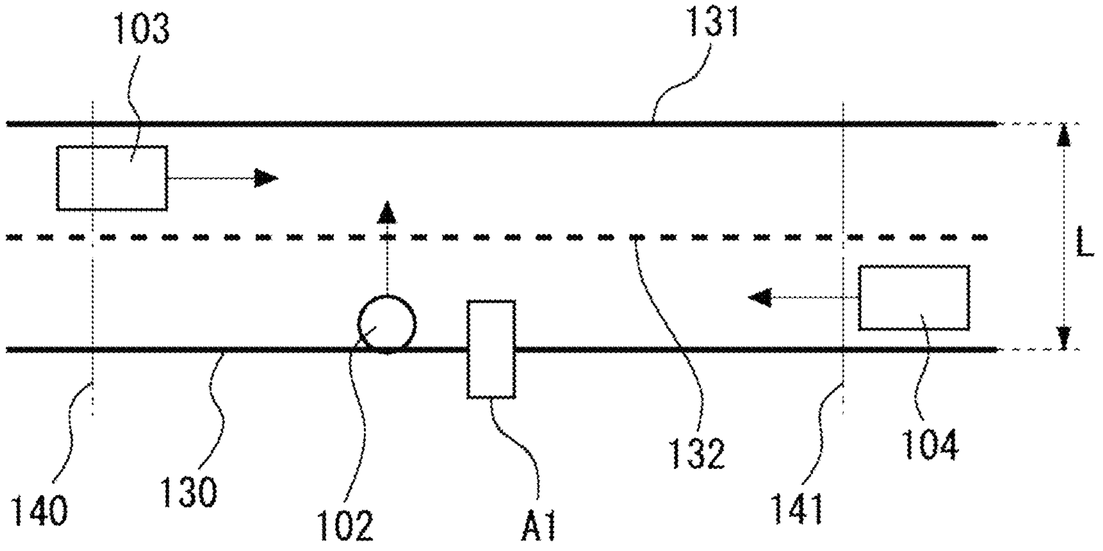
FIG. 5 is a diagram for explaining photographing range of the camera of the road light and information to be detected.

FIG. 5 is a diagram for explaining photographing range of the camera of the road light and information to be detected. FIG. 5 shows a schematic view of a road as seen from above in a predetermined range corresponding to the installation position of the road light A1 as an example. Note that the same applies to the other road lights A2 to A9. The photographing range of the camera 21 is set so that it includes at least the range surrounded by reference lines 140, 141 on both the left and right sides of the installation position of the road light A1 in the figure, and lane boundary line 130 on the front side and lane boundary line 131 on the back side based on the installation position of the road light A1. Note that the same applies to the other road lights A2 to A9. Further, the photographing range of each of the road lights A1 to A9 is preferably set so that there is no gap between the photographing ranges of adjacent road lights.

As shown in the figure, for example, assume that, based on the installation position of the road light A1, there is a vehicle 103 traveling to the right in the lane at the back side of a center line 132, there is a vehicle 104 traveling to the left in the figure at the front side of the center line 132, and there is a pedestrian 102 attempting to cross from the front side to the back side of the center line 132. At this time, the image processing unit 31 of the autonomous control unit 22 detects the direction of travel and speed of movement for each of vehicles 103, 104 by image processing.

Further, the image processing unit 31 detects the direction of travel and speed of movement of the pedestrian 102 who is crossing the road by image processing. Then the image processing unit 31 detects the pedestrian 102 as a crosser when the pedestrian 102 is moving in the direction of crossing the road. Here, note that regardless of the direction of travel of the pedestrian 102, when the pedestrian 102 is present within the photographing range, the unit may uniformly detect the pedestrian 102 as a crosser.

The signal generating unit 32 of the autonomous control unit 22 generates a vehicle detection signal indicating the presence of a vehicle 103 or vehicle 104, and generates a crosser detection signal indicating the presence of a pedestrian 102 who is a crosser, based on the detection results by the image processing unit 31. The data for these vehicle detection signals and crosser detection signals are each transmitted to the necessary road lights among the other road lights A2 to A9. The method for determining the necessary road lights will be described below.

Let "D" be the distance between adjacent road lights as described above (refer to FIG. 2), let "V1" be the moving speed of the pedestrian 102 who is a crosser, let "V2" be the legal speed set for the road, and let "L" be the road width. At this time, the number of road lights that are targets for transmitting a crosser detection signal can be obtained using the following calculation formula, for example.

$$\text{Number of road lights} = \{((L/V1) \times (V2 + \alpha))/D\} + 1$$

Here, α is a value for correcting the legal speed V2 in accordance with the actual road situation, and for example, can be set to a value equivalent to the difference between an actual vehicle average travel speed obtained by observing the target road within a certain period of time and the legal speed V2.

In the above calculation formula, (L/V1) is a term that calculates an estimate of the time required for the pedestrian 102 who is a crosser to cross the road (crossing time). By multiplying this crossing time by the term (V2+α), an estimated distance traveled by each vehicle during the crossing time can be obtained. By dividing this estimated travel distance by the distance D between the road lights, it is possible to obtain an estimate of how many road lights correspond to the estimated distance traveled by each vehicle. Furthermore, "+1" is added to allow for a margin in the number of road lights, and this number may be set to 2 or more depending on the situation. Based on the number of road lights obtained by this calculation formula, crosser detection signal data is transmitted to the nearby road lights on both sides. For example, if the number of road lights determined for the road light A5 is two, crosser detection signal data is transmitted to the road lights A3, A4, A6, and A7, two on each side of the road light A5.

Following is a concrete numerical example and a calculation example of the number of road lights based on the numerical example. Let the road width L be 7 (m), the moving speed V1 of the pedestrian 102 who is a crosser be 1.3 (m/s), the legal speed V2 be 50 (km/h), i.e. 14 (m/s), the correction value a be 0 (m/s), and the distance D between the road lights be 30 (m). Then, the number of calculated road lights based on the above calculation formula becomes 3.5, which can be rounded up to 4. In this case, by using one road light as a reference, crosser detection signal data is sent to four road lights on each side of the referenced road light.

Further, regardless of the presence or absence of a pedestrian 102, when vehicles 103, 104 are present, based on the estimated stopping distance F predicted from the vehicle speeds (traveling speeds) of these vehicles, the number of road lights that becomes the target for transmitting a vehicle detection signal can be determined as follows. Here, note that the estimated stopping distance F refers to the distance that is estimated to be required for a vehicle to stop, and may be determined based on the legal speed V2. Further, the estimated stopping distance F may also be set variably depending on the weather, such as when it is raining.

$$\text{Number of road lights} = (F/D) + 1$$

As an example, if the estimated stopping distance F on a dry road surface when the traveling speed is 50 (km/h) is 24.5 (m) and the distance D between road lights is 30 (m), the number of road lights according to the above calculation formula becomes 1.81, which can be rounded up to 2. In this case, based on one road light, vehicle detection signal data is transmitted to two road lights which exist in the direction of travel of the vehicle. For example, if only vehicle 103 is detected at the road light A5 and the vehicle is traveling in the direction toward the road light A6, vehicle detection signal data is transmitted to the road light A6 and the next road light A7.

Figure 6:
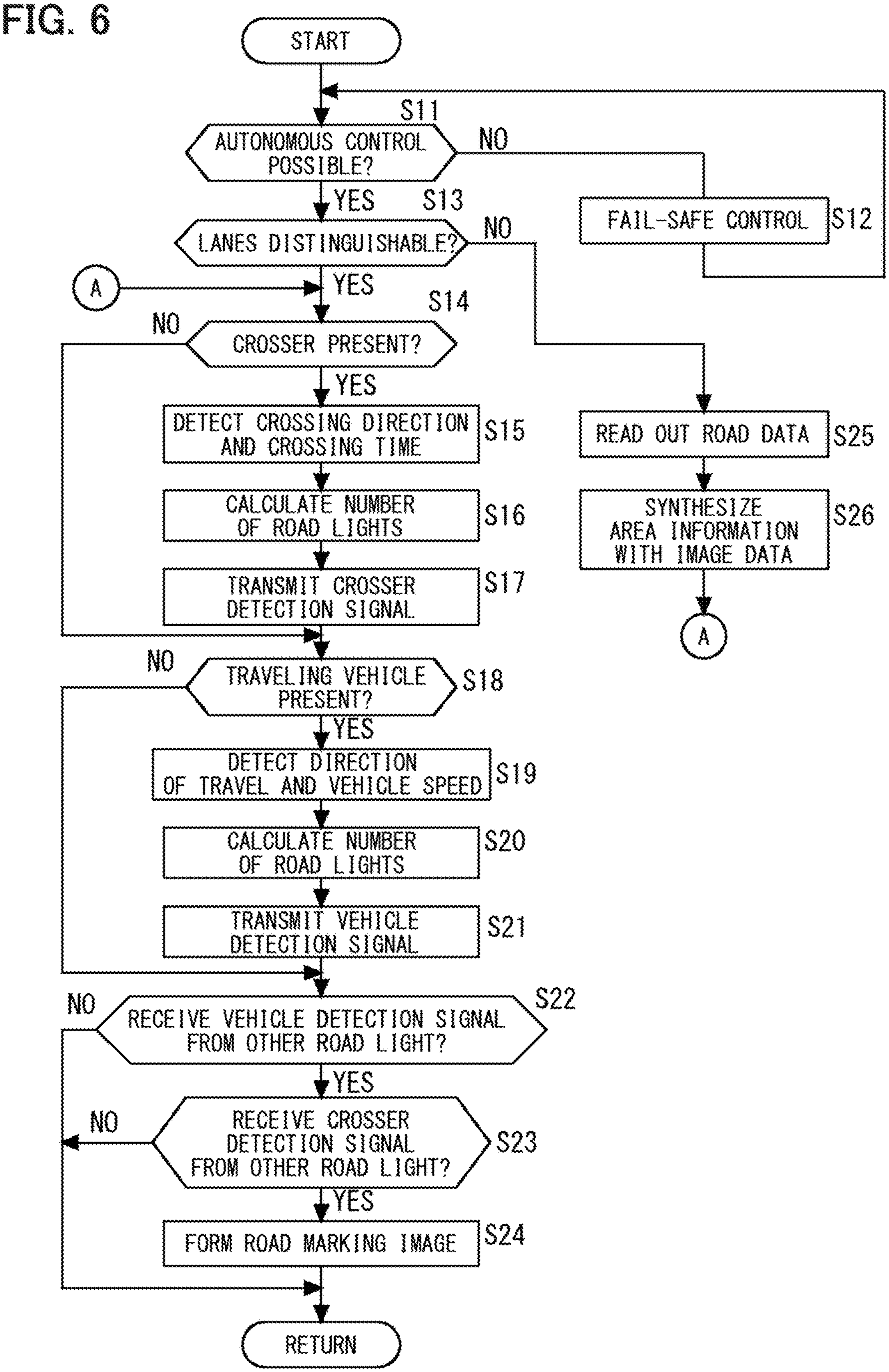
FIG. 6 is a flowchart illustrating an operation procedure of a road light.

FIG. 6 is a flowchart illustrating an operation procedure of a road light. Here, operation of the road light A1 is exemplified and will be described according to the flowchart. Note that it is assumed that the other road lights A2 to A9 also operate in the same manner in parallel. Further, the order of each process can be changed as long as it does not cause inconsistencies in the control result, and other processes not described may be added, and these configurations are not excluded.

The autonomous control unit 22 of the road light A1 performs a self-diagnosis to determine whether autonomous control is possible, and when autonomous control is not possible (step S11; NO), the process transitions to a fail-safe control mode (step S12). The fail-safe control mode is a mode in which alternative control is performed by the management server 10.

When autonomous control is possible (step S11; YES), the image processing unit 31 of the autonomous control unit 22 performs image processing based on the image data obtained by the camera 21, and when the lanes are distinguishable (step S13; YES), the process proceeds to detection of a crosser and a traveling vehicle. Here, the phrase "the lanes are distinguishable" refers to a situation where the lanes can be detected, not a situation where the lanes are hidden by snowfall or other factors and cannot be detected by image processing. The process when the lanes are not distinguishable (steps S25, S26) will be described later.

When a pedestrian who is a crosser is present within the photographing range (step S14; YES), the image processing unit 31 detects the crossing direction of the crosser and detects the crossing time of the crosser based on the road width L and the crosser's movement speed V1 (step S15). Further, the signal generating unit 32 calculates the number of road lights to which a crosser detection signal is to be transmitted based on the above calculation formula (step S16).

The signal generating unit 32 generates a crosser detection signal and transmits data of the crosser detection signal to the other road lights which were determined based on the number of road lights calculated in step S16 (step S17).

On the other hand, when there is no pedestrian crossing the road (step S14; NO), the image processing unit 31 does not perform steps S15 to S17, and proceeds to the following process. Specifically, when there exists a traveling vehicle within the photographing range (step S18; YES), the image processing unit 31 detects the vehicle's direction of travel and detects the vehicle speed (step S19). The vehicle speed can be calculated, for example, based on the amount of change in the vehicle's position and the elapsed time from a certain time to the next time.

Next, the signal generating unit 32 calculates the number of road lights to which a vehicle detection signal is to be transmitted using the above calculation formula based on the estimated stopping distance predicted from the calculated vehicle speed (step S20).

The signal generating unit 32 generates a vehicle detection signal and transmits the data of the vehicle detection signal to the other road lights which were determined based on the number of road lights calculated in step S20 (step S21). Here, when no vehicle is present (step S18; NO), the process proceeds to step S22 without performing steps S19 to S21.

When data of the vehicle detection signal transmitted from the other road light is received by the signal receiving unit 34 of the communication unit 26 (step S22; YES), and data of the crosser detection signal transmitted from the other road light is received by the signal receiving unit 34 of the communication unit 26 (step S23; YES), the notification control unit 24 controls the notification unit 25 to form a predetermined road marking image on the road surface. As a result, the road marking image is formed on the road surface (step S24). Thereafter, the process returns to step S11, and the subsequent processes are repeated.

Here, when the data of the vehicle detection signal transmitted from the other road light is not received (step S22; NO), or the data of the crosser detection signal transmitted from the other road light is not received (step S23; NO), the notification control unit 24 does not control to cause the formation of the road marking image. In this case as well, the process returns to step S11, and the subsequent processes are repeated.

Further, in the above-described step S13, when the lanes cannot be identified (step S13; NO), the image processing unit 31 reads out road data that has been prepared in advance and stored in a memory (not shown) (step S25), and based on this road data, synthesizes the area information such as lanes or the like with the image data obtained by the camera 21 (step S26). The road data referred to here is assumed to be extracted from the image data photographed by the camera 21 of each of the road light A1, etc. and stored in memory, when the road lights A1 to A9 are initially installed. By using such road data, it is possible to execute each process from step S14 onward, even when the lanes cannot be detected due to snowfall or the like. As shown in the figure, after the process of step S26 is completed, the process proceeds to step S14.

Figure 7:
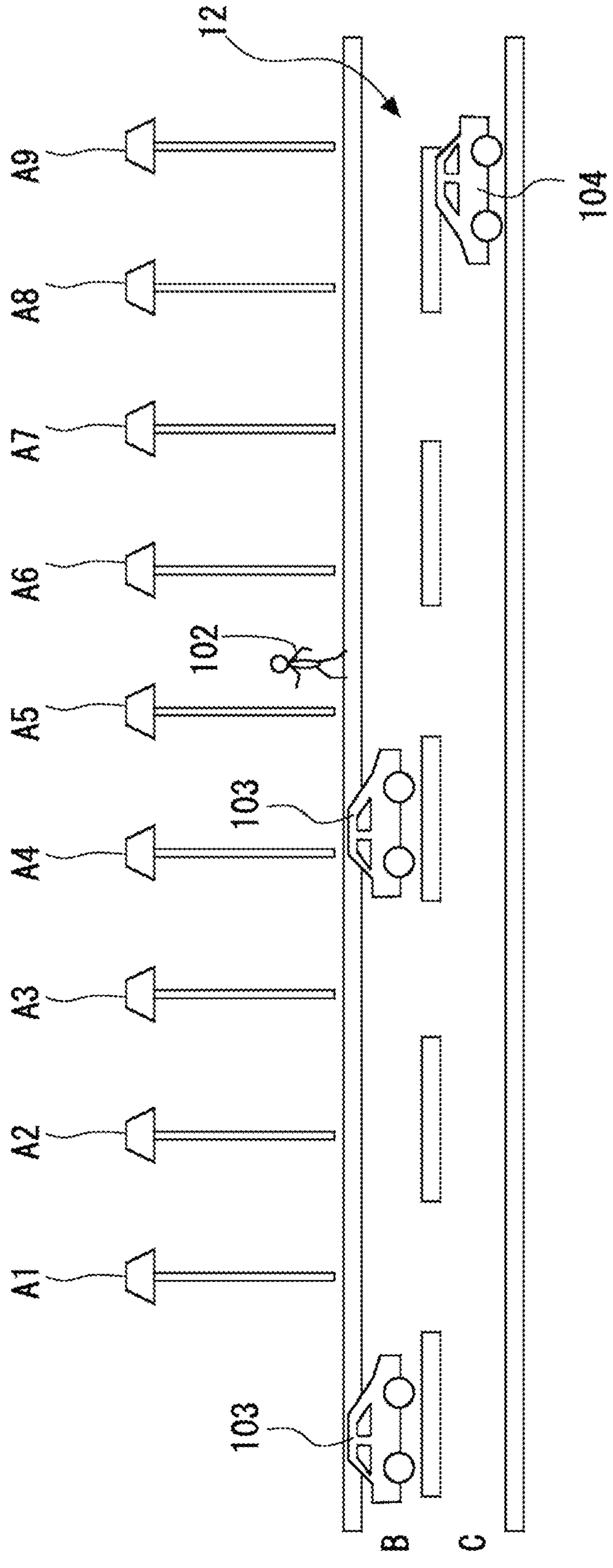
FIG. 7 is one example of a diagram schematically showing a road situation.

FIG. 7 is one example of a diagram schematically showing a road situation. Further, FIG. 8 is a diagram for explaining operation of each road light of a road drawing system in the road situation shown in FIG. 7. Here, on a road 12 with one oncoming lane as shown in FIG. 7, it is assumed that there are two vehicles 103 traveling in lane B at the back side in the figure, there is one vehicle 104 traveling in lane C at the front side in the figure, and there exists a pedestrian 102 outside the road (on the road side strip). In detail, one vehicle 103 in lane B is near the road light A1 (opposite the road light A9), and the other vehicle 103 is near the road light A4, and both are traveling to the right in the figure. Further, the vehicle 104 in lane C is near the road light A9 and traveling to the left in the figure. Furthermore, the pedestrian 102 is present near the road light A5 but is not crossing the road 12. In other words, in this example, the pedestrian 102 is not a crosser.

As shown in FIG. 8, since the pedestrian 102 is not a crosser, none of the road lights A1 to A9 detect the pedestrian. Therefore, none of the road lights A1 to A9 generate or transmit a crosser detection signal for either lane B (B-lane) or lane C (C-lane), and do not receive a crosser detection signal from any other road lights. On the other hand, since the road light A1 detects one vehicle 103 in lane B, it transmits a vehicle detection signal to the road light A2 which exists in the direction of travel of the vehicle 103 according to its vehicle speed, and since this vehicle 103 exists in the front side of the road light A1 (on the left side in the figure), the road light A1 also supplies a vehicle detection signal to its own notification control unit 24. In the figure, a state of having a vehicle detection signal is indicated by a circle.

Further, the road light A4 detects the other vehicle 103 in lane B, and therefore transmits a vehicle detection signal to the road lights A5-A7 which exists in the direction of travel of vehicle 103 according to the vehicle's speed. Further, the road light A9 detects vehicle 104 in lane C, and therefore transmits a vehicle detection signal to the road lights A6-A8 which exists in the direction of travel of vehicle 104 according to the vehicle's speed. In the figure, a state of having a vehicle detection signal is indicated by a circle.

Thus, since each of the road lights A1, A2, A4 to A8 receives a vehicle detection signal for lane B and/or lane C but does not receive a crosser detection signal, each of the road lights does not perform any operation to form a road marking image on the road surface. Further, since the road light A3 does not receive either a vehicle detection signal or a crosser detection signal, the road light does not perform any operation to form a road marking image on the road surface. Therefore, in this example, none of the road lights A1 to A9 form a road marking image.

Figure 9:
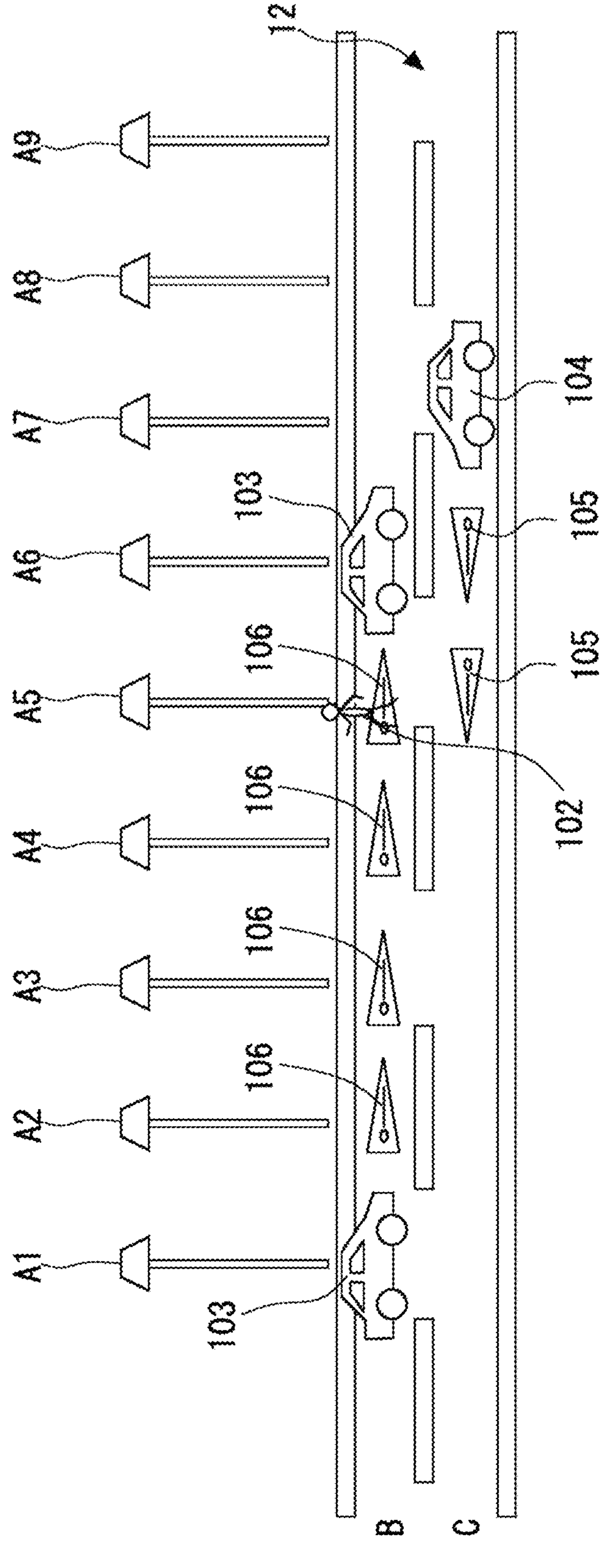
FIG. 9 is another example of a diagram schematically showing a road situation.

FIG. 9 is another example of a diagram schematically showing a road situation. Further, FIG. 10 is a diagram for explaining operation of each road light of a road drawing system in the road situation shown in FIG. 9. Here, on a road 12 with one oncoming lane as shown in FIG. 9, it is assumed that there are two vehicles 103 traveling in lane B at the back side in the figure, there is one vehicle 104 traveling in lane C at the front side in the figure, and there exists a pedestrian 102 crossing lane B near the road light A5. In detail, one vehicle 103 in lane B is near the road light A1, and the other vehicle 103 is near the road light A6, and both are traveling to the right in the figure. Further, the vehicle 104 in lane C is near the road light A7 and traveling to the left in the figure. Furthermore, the pedestrian 102 who is a crosser is present near the road light A5 and is about to cross the road 12.

As shown in FIG. 10, the pedestrian 102 is detected as a crosser by the road light A5. Therefore, the road light A5 generates a crosser detection signal and transmits a crosser detection signal related to lane B (B-lane crosser detection signal) to the three road lights A2 to A4 on the left side of the road light A5 in the figure, and transmits a crosser detection signal related to lane C (C-lane crosser detection signal) to the three road lights A6-A8 on the right side of the road light A5 in the figure. Further, since the pedestrian 102 is heading toward lane C, the road light A5 also supplies to its own notification control unit 24 a crosser detection signal related to lane B (B-lane crosser detection signal) and a crosser detection signal related to lane C (C-lane crosser detection signal).

Further, since the road light A1 detects one vehicle 103 in lane B, depending on the vehicle's speed, the road light A1 transmits a vehicle detection signal related to lane B (B-lane vehicle detection signal) to the road lights A2 to A5 which exist in the direction of travel of the vehicle 103.

Further, since the road light A6 detects the other vehicle 103 in lane B, depending on the vehicle's speed, the road light A6 transmits a vehicle detection signal related to lane B (B-lane vehicle detection signal) to the road lights A7-A9 which exist in the direction of travel of the vehicle 103.

Further, since the road light A7 detects the vehicle 104 in lane C, depending on the vehicle's speed, the road light A7 transmits a vehicle detection signal related to lane C (C-lane crosser detection signal) to the road lights A4 to A6 which exist in the direction of travel of the vehicle 104.

At this time, since the road light A1 does not receive a vehicle detection signal nor a crosser detection signal related to lane B and/or lane C, the road light does not perform operation of forming a road marking image on the road surface. Since the road lights A2 to A5 receive a crosser detection signal related to lane B (B-lane crosser detection signal) and a vehicle detection signal related to lane B (B-lane vehicle detection signal), the road lights form road marking images 106 on the road surface of lane B as shown in FIG. 9. Further, since the road lights A5 and A6 receive a crosser detection signal related to lane C (C-lane crosser detection signal) and a vehicle detection signal related to lane C (C-lane vehicle detection signal), the road lights form a road marking images 105 on the road surface of lane C as shown in FIG. 9. Due to these road marking images 105 and 106, passengers of each vehicle 103 and 104 are alerted. Here, in addition to the road marking images 105 and 106 as described above, notification may be provided by side surface warning lights or dedicated narrow-band communication or the like.

According to the above embodiment, each of the grouped road lights autonomously detects vehicles and crossers, and transmits and receives vehicle detection signal data and crosser detection signal data corresponding to the detection results directly within the group without going through the server 10, and the road light that has acquired both the vehicle detection signal and the crosser detection signal forms a road marking image for each lane. Thereby, this suppresses unnecessary alert being called out, and can alert (notify) the passengers of each vehicle and crossers by using road markings or the like at an appropriate timing according to the road situation.

Further, since only the road light whose number and position corresponding to the moving speed of the crosser and each vehicle forms a road marking image, more than necessary road marking images are not formed. As a result, less necessary alert to the passengers of each vehicle and pedestrians surrounding the road is suppressed.

Further, since data is transmitted and received directly between the road lights without going through a host device such as the server 10, communication delay is reduced, and the vehicle detection signal and the crosser detection signal data can be transmitted and received more quickly. Therefore, this makes it possible to control with finer time resolution, and a notification system with superior responsiveness can be constructed.

Here, the present disclosure is not limited to the content of the embodiment described above, and can be implemented with various modifications within the scope of the gist of the present disclosure. For example, in the above-described embodiment, a pedestrian is shown as an example of a crosser, but a rider of a bicycle or the like may also be treated as a crosser.

Further, when each road light detects a crosser and also detects a vehicle, rather than forming a road marking image directly below its own road light, the road marking image may be formed at a position shifted to the left or right in the direction of travel of the vehicle. This can avoid overlapping of a pedestrian who is a crosser with the road marking image, which makes the road marking image easier to visualize.

Further, the color tone and image type of the road marking image may be changed between daytime and night time. For example, it is conceivable to form a road marking image in a color tone that is not easily obscured by sunlight during daytime (e.g., a strong red color tone, as sunlight is close to white), and a road marking image in a color tone that is not easily obscured by other lighting during night time (e.g., any color tone different from the other lighting may suffice, if the other lighting is a yellowish color, a white color tone or a strong red color tone or the like may suffice).

Further, the illumination state of each road light may be changed when forming a road marking image. For example, it is conceivable to increase the brightness of the road marking image more than that of the illumination light by the road light illumination unit 23 when forming the road marking image.

Further, when a pedestrian who is a crosser is crossing the road diagonally, the crossing distance can be predicted from its direction of travel, and the time required for the movement can be calculated based on the predicted crossing distance, and then the number of road lights that are targets for transmitting a crosser detection signal may be calculated.

Further, the vehicles to be detected are not limited to four-wheeled vehicles in the above-described embodiment, and may include various vehicles such as two-wheeled vehicles.

Further, in the above-described embodiment, the road width L has been treated as a known value, but it may also be obtained from the image data photographed by a camera or obtained by a distance sensor. In such a case, values such as road width and travel speed may be treated as absolute values (actual values), or as relative values based on the number of pixels in the image data, frame rate, etc.

Figure 11:
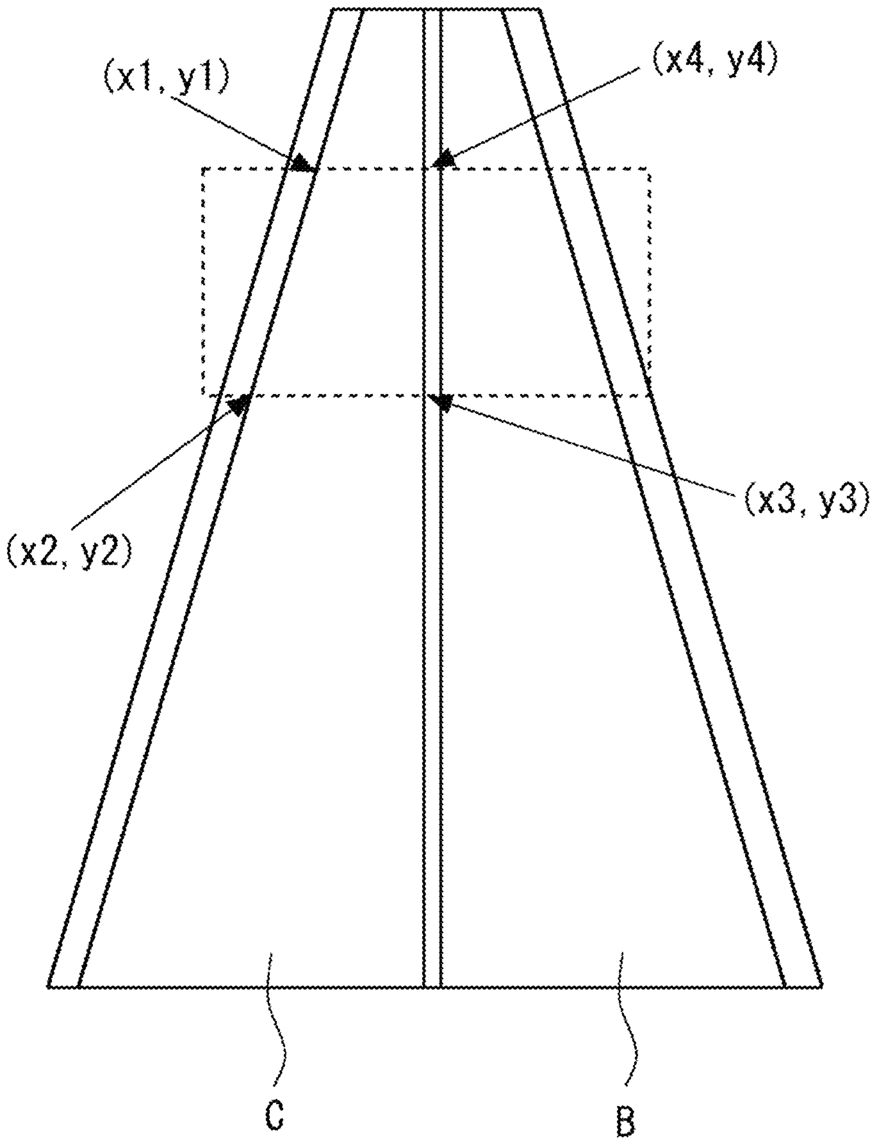
FIG. 11 is a diagram for explaining an example of road data.

Furthermore, as referred to in the above-described embodiment, road data may be obtained in advance and stored in memory in case lanes cannot be detected due to snowfall or the like. Specifically, in reference to two-dimensional information of image data obtained from the camera of a road light, lane information, vehicle travel direction, number of lanes, road width (road side strip width, lane width, center line width, median strip width) or the like may be stored in memory as coordinate values. For example, as shown in FIG. 11, as for information of lane C, the photographing range of lane C may be defined by coordinate values of (x1, y1), (x2, y2), (x3, y3), and (x4, y4). Further, vehicle travel direction may be defined as the direction from (x2, y2) and (x3, y3) to (x1, y1) and (x4, y4). Lane B may be defined in a similar manner.

REFERENCE SIGNS LIST

A1-A9: Road light
10: Management server
12: Road
21: Camera
22: Autonomous control unit
23: Road light illumination unit
24: Notification control unit
25: Notification unit
26: Communication unit
31: Image processing unit
32: Signal generating unit
33: Signal transmitting unit
34: Signal receiving unit
100: Notification system
102: Pedestrian (Crosser)
103, 104: Vehicle
105, 106: Road marking image

The invention claimed is:

1. A notification system configured to include a plurality of road lights installed along a road which are directly connected to mutually communicate with each other, wherein each of the plurality of road lights comprises:

an image processing unit that detects presence or absence of a crosser who proceeds to cross the road and presence or absence of a vehicle traveling on the road, based on image data obtained by photographing the road;

a first signal processing unit that generates a crosser detection signal when the crosser is present and transmits the crosser detection signal to the other road lights, a second signal processing unit that generates a vehicle detection signal when the vehicle is present and transmits the vehicle detection signal to the other road lights which exist in the traveling direction of the vehicle, and a notification execution unit that performs notification for alert purpose when both the crosser detection signal and the vehicle detection signal transmitted from the other road lights are received, wherein the first signal processing unit calculates an estimated crossing time required for the crosser to cross the road based on the crosser's moving speed and the width of the road, and determines which road light is to receive the crosser detection signal from among the other road lights according to the estimated crossing time.

2. The notification system according to claim 1, wherein the notification by the notification execution unit is at least one of the following selected from the formation of a road marking image on the road, a side surface warning light, and alerting the vehicle by narrow-band communication.

3. The notification system according to claim 1 comprising a management server that is communicatively connected to each of the plurality of road lights and is configured to manage each of the plurality of road lights, wherein each of the plurality of road lights transmits and receives the crosser detection signal and the vehicle detection signal directly to and from each other without going through the management server.

4. The notification system according to claim 1, wherein each of the plurality of road lights is equipped with a camera that generates the image data.

5. A notification system configured to include a plurality of road lights installed along a road which are directly connected to mutually communicate with each other, wherein each of the plurality of road lights comprises:

an image processing unit that detects presence or absence of a crosser who proceeds to cross the road and presence or absence of a vehicle traveling on the road, based on image data obtained by photographing the road;

a first signal processing unit that generates a crosser detection signal when the crosser is present and transmits the crosser detection signal to the other road lights, a second signal processing unit that generates a vehicle detection signal when the vehicle is present and transmits the vehicle detection signal to the other road lights which exist in the traveling direction of the vehicle, and a notification execution unit that performs notification for alert purpose when both the crosser detection signal and the vehicle detection signal transmitted from the other road lights are received, wherein the second signal processing unit determines the road light to which the vehicle detection signal is to be transmitted from among the other road lights according to an estimated stopping distance corresponding to the moving speed of the vehicle.

6. The notification system according to claim 5, wherein the notification by the notification execution unit is at least one of the following selected from the formation of a road marking image on the road, a side surface warning light, and alerting the vehicle by narrow-band communication.

7. The notification system according to claim 5, wherein the second signal processing unit determines the road light to which the vehicle detection signal is to be transmitted from among the other road lights which exist in the traveling direction of the vehicle.

8. The notification system according to claim 5 comprising a management server that is communicatively connected to each of the plurality of road lights and is configured to manage each of the plurality of road lights, wherein each of the plurality of road lights transmits and receives the crosser detection signal and the vehicle detection signal directly to and from each other without going through the management server.

9. The notification system according to claim 5, wherein each of the plurality of road lights is equipped with a camera that generates the image data.

* * * * *